(12) United States Patent
Konstant

(10) Patent No.: US 7,828,161 B2
(45) Date of Patent: Nov. 9, 2010

(54) BASES FOR STORAGE RACK TRUSSES

(75) Inventor: Anthony N. Konstant, Winnetka, IL (US)

(73) Assignee: Konstant Products, Inc., Rolling Meadows, IL (US)

( * ) Notice: Subject to any disclaimer, the term of this patent is extended or adjusted under 35 U.S.C. 154(b) by 119 days.

(21) Appl. No.: 11/977,399

(22) Filed: Oct. 24, 2007

(65) Prior Publication Data

US 2009/0107943 A1    Apr. 30, 2009

(51) Int. Cl.
    *A47B 43/00*    (2006.01)
(52) U.S. Cl. .................. 211/191; 211/182; 211/183; 52/690; 52/244
(58) Field of Classification Search ............ 248/188.91; 211/191
    See application file for complete search history.

(56) References Cited

U.S. PATENT DOCUMENTS

| | | | | |
|---|---|---|---|---|
| 3,229,790 A | * | 1/1966 | Shayne | 403/172 |
| 3,831,921 A | * | 8/1974 | Negado | 267/139 |
| 4,088,229 A | * | 5/1978 | Jacoby et al. | 211/191 |
| 4,291,812 A | * | 9/1981 | Harmes et al. | 211/207 |
| 4,678,091 A | | 7/1987 | Konstant | |
| 5,369,925 A | * | 12/1994 | Vargo | 52/244 |
| 5,622,356 A | * | 4/1997 | Duggan | 256/1 |
| 7,007,815 B2 | * | 3/2006 | Anderson et al. | 211/191 |
| 7,104,514 B2 | * | 9/2006 | Ciarlo | 248/345.1 |
| 2007/0170137 A1 | * | 7/2007 | Thelwell | 211/183 |
| 2007/0193190 A1 | | 8/2007 | Konstant | |
| 2008/0029676 A1 | * | 2/2008 | Huxtable et al. | 248/345.1 |
| 2008/0083686 A1 | * | 4/2008 | Jones | 211/191 |
| 2009/0107943 A1 | * | 4/2009 | Konstant | 211/191 |

* cited by examiner

*Primary Examiner*—J. Allen Shriver, II
*Assistant Examiner*—Alaeddin Mohseni
(74) *Attorney, Agent, or Firm*—Niro, Haller & Niro

(57) ABSTRACT

A reinforced rack truss base to protect against damage to a rack truss storage system is provided.

7 Claims, 3 Drawing Sheets

BASES FOR STORAGE RACK TRUSSES

BACKGROUND OF THE INVENTION

The present inventions relate generally to trusses typically used for storage racks. More particularly, the present inventions relate to bases for storage rack trusses that provide reinforcement to minimize damage if hit by lift trucks.

Shelf-type storage racks are well known in the storage and warehouse industries. Such racks typically include at least four columns, two in the front or access aisle and two in the back. Lateral beams interconnect the pairs of front columns and pairs of back columns. The lateral beams, in conjunction with optional cross members between the lateral beams, form shelves used for storage of pallets and their loads.

Each pair of front and back columns are provided with transverse support beams that interconnect the front and back columns. Diagonal support braces between the front and back columns may also be provided for increased strength, rigidity and stiffness. Each pair of front and back columns and the associated beams and braces are typically referred to in the industry as rack trusses. Each pair of opposing rack trusses, and their interconnecting lateral beams, form a typical shelf-type storage rack. The racks may be placed side-by-side and/or back-to-back in arrays to form the desired storage rack system.

The components that form the storage rack trusses, such as the columns, transverse supports and diagonal support braces, are typically welded together and painted at the fabrication site and then shipped to the storage facility where they are installed for use. For example, the transverse supports and any diagonals are typically welded to the front and back columns to form the rack truss. Once at the storage facility, the lateral beams interconnecting each opposing pair of trusses are installed by welding or bolting (see e.g., U.S. Pat. No. 4,678,091). The bottom of the columns of the rack trusses may be placed directly on the warehouse floor. Because the trusses are fabricated prior to shipping and installation, known rack trusses are somewhat difficult to handle during assembly, take-up more space during shipping and can be difficult to paint. In addition, because the columns of the rack trusses are typically placed on the warehouse floor, with or without base plates, the front columns adjacent to the access aisle are subject to damage if hit by a lift truck during the loading and unloading process.

More recently, bolted or "knock-down" trusses have become known. For example, a variety of bolted trusses, including trusses having bases that help reinforce the truss against damage by contact by a lift truck, are shown and described in U.S. Publication No. 2007-0193190-A1 to Konstant. A variety of columns to which beams, braces and the like may be bolted to form trusses and storage racks are also available.

SUMMARY OF INVENTION

The present inventions preserve the advantages of known storage racks and storage rack trusses and also provide new features and advantages. For example, the present inventions provide reinforced bases for rack trusses which may then be bolted together at the site. The reinforced bases of the present inventions provide reinforcement in the lower portion of the truss to help resist abuse from forks of fork trucks and the like. In addition, the reinforced bases may be used in conjunction with known bases, such as "knock-down" or trapezoidally-shaped bases, that elevate the reinforced bases above the area of greatest potential contact with lift trucks, which helps minimize the potential for contact with lift trucks.

In accordance with the present invention, a reinforced truss base is provided having a front column support leg, rear column support leg and a transverse torsional member interconnecting the front and rear column support legs. The front and rear column support legs may be made from a structural channel having a web and a pair of opposed flanges, wherein each of the channels face away from each other when assembled. Further, the transverse torsional member may be made from a tubular member and typical columns may be bolted, welded or otherwise attached thereto. The reinforced truss may be supported or used by a typical drive-in rack truss, a knock-down truss base or a trapezoidally-shaped truss base having, among other things, a front v-leg, center v-leg, rear leg and a transverse brace.

An object of the present inventions is to provide a reinforced truss base that provides reinforcement of the columns at the lower portion of the truss, particularly adjacent to the access aisle.

Another object of the present inventions is to provide a reinforced truss base to which typical columns may be attached using bolts and/or which provides reinforcement of the columns at the lower portion of the truss.

Yet another object of the present inventions is to provide a truss base that reduces potential contact from lift trucks.

Yet an additional object of the present inventions is to provide reinforced truss bases so that the columns may be removably secured thereto for onsite assembly.

A further object of the present inventions is to provide a combined reinforced truss base with a trapezoidally-shaped truss base or a knock-down truss base.

Still a further object of the present inventions is to provide a reinforced truss base with increased torsional strength.

Still yet another object of the present invention is to elevate the bolted columns using base trusses in conjunction with reinforced truss bases so that the bolted column and resulting rack truss are above the area where most damage to the truss may occur as a result of contact by a lift truck or other loading/unloading device.

Yet an additional object of the present invention is to provide a reinforced truss base to which standard roll formed column members may be readily attached.

INVENTOR'S DEFINITION OF THE TERMS

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated features and advantages of the present inventions will become apparent from the following descriptions and drawings wherein like reference numerals represent like elements in the various views, and in which.

DETAILED DESCRIPTION OF THE PREFERRED EMBODIMENTS

Figure 1:
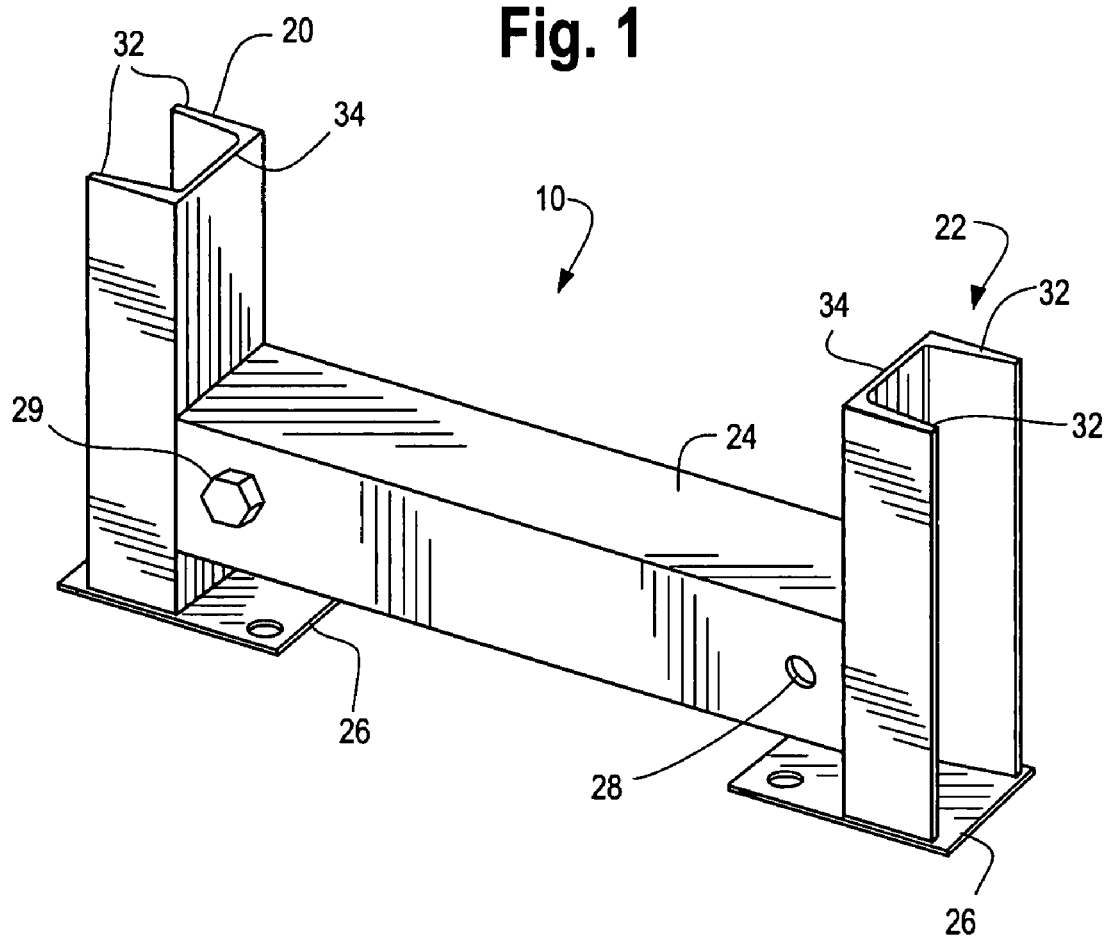
FIG. 1 is a side perspective view of a preferred embodiment of a reinforced truss base of the present invention.
Figure 2:
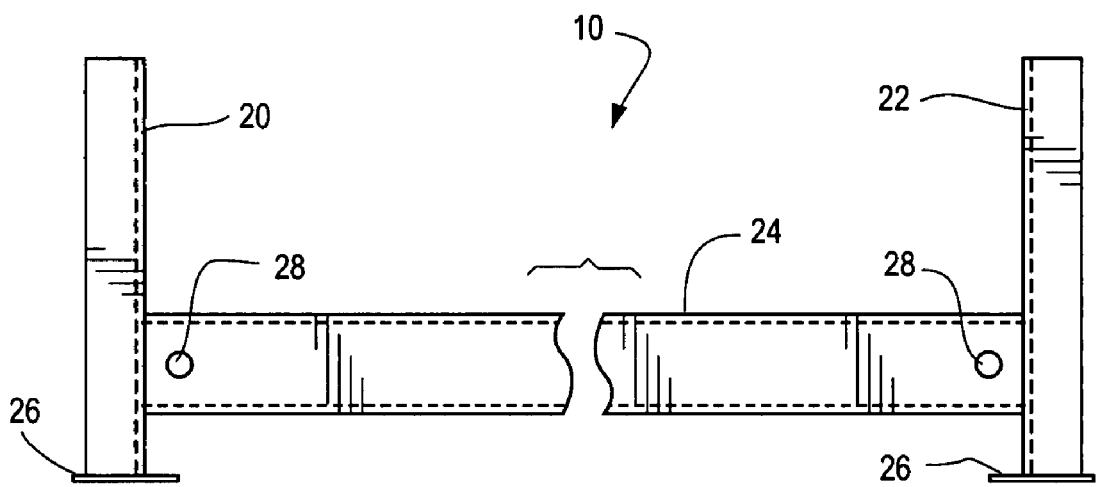
FIG. 2 is a side view of the preferred truss base of FIG. 1.

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

A preferred embodiment of a reinforced truss base of the present invention is shown as 10 in FIGS. 1-4. A preferred embodiment of a combination of a typical trapezoidally-shaped truss base 12 and preferred reinforced truss base 10 is shown generally as 14 in FIG. 5. And, a preferred embodiment of a combination reinforced truss base 10 supported by a typical drive-in rack truss base 16 is shown in FIG. 6.

Preferred reinforced truss base 10 includes a front column support leg 20 and a rear column support leg 22. Front leg 20 and rear leg 22 are interconnected by transverse torsion member 24, which may be welded or otherwise secured to legs 20 and 22. Optionally, a foot 26 may be attached to the bottom of legs 20 and 22 that may rest upon the ground or warehouse floor (not shown). Feet 26 may also serve to support the bottom end of column 30 when attached to base 10. Each end of transverse torsional member 24 may be provided with holes 28 through which bolts 29 may be used to secure a typical column member 30 as is familiar to those of skill in the art.

In the preferred embodiment, transverse member 24 is tubular, as this type of member provides the best torsional strength. Front and rear support legs 20 and 22 are preferably formed from structural channels having two opposed flanges 32 interconnected by a web 34. In a preferred embodiment, flanges 32 face outward as shown so that transverse torsional member 24 may be readily welded, bolted or otherwise secured at each end to webs 34. In addition, column member 30 may be readily attached to torsional member 24 when the support legs 20 and 22 are arranged in this manner.

Figure 3:
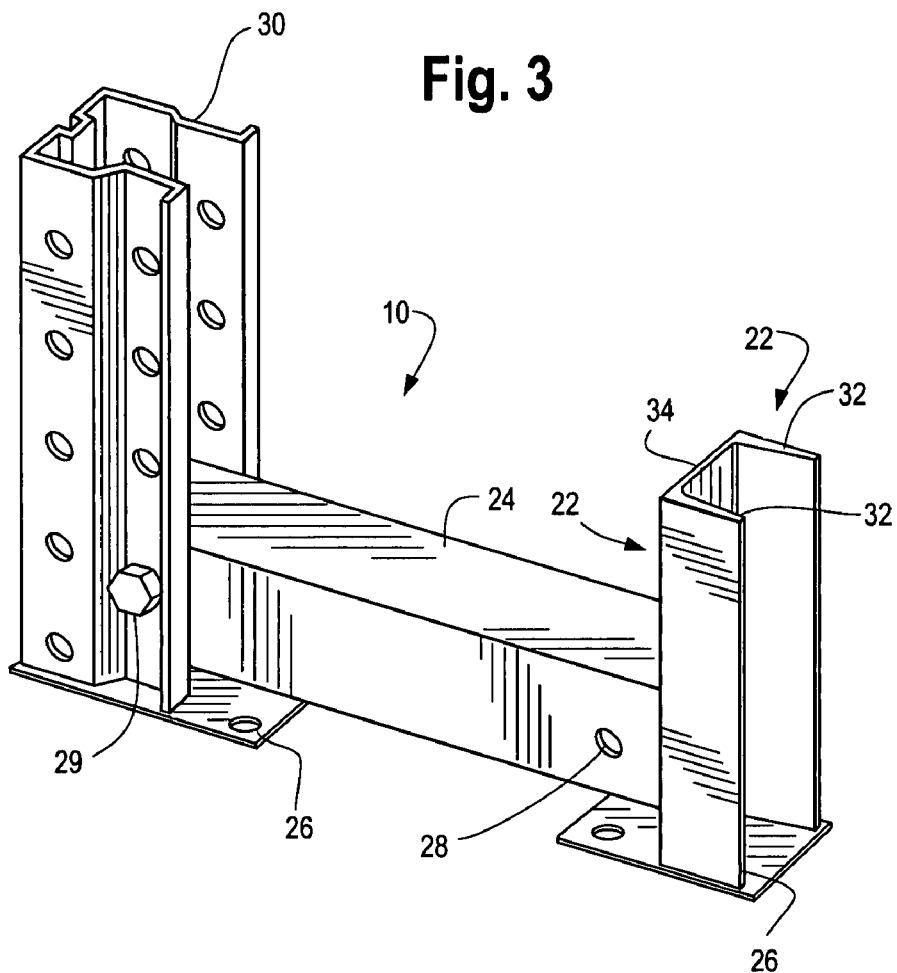
FIG. 3 is a side perspective view of the preferred base of FIG. 1 with a typical cold rolled column shown installed thereon.
Figure 4:
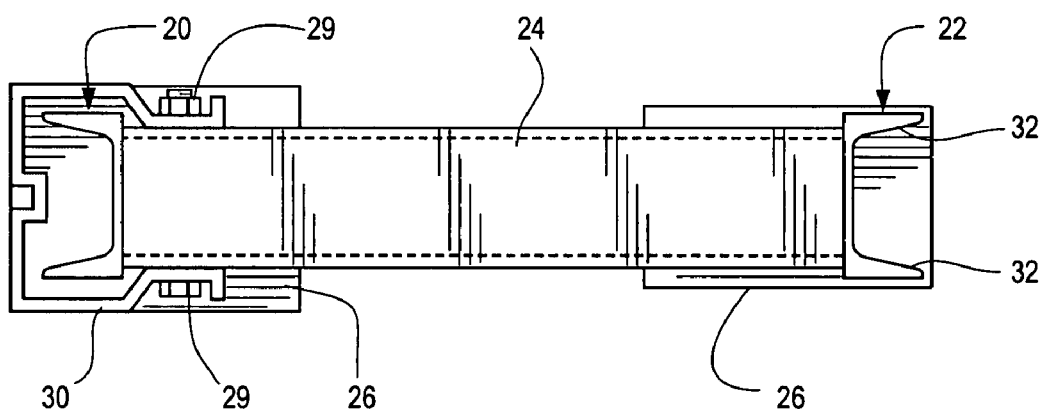
FIG. 4 is a top perspective view of the embodiment of FIG. 3.

As shown in FIGS. 3 and 4, a typical roll formed column member 30 may be supported by one or both of the column support legs 20 and 22, and attached to torsional member 24. In the preferred embodiment, column 30 is a typical cold rolled column having holes to accommodate beams, braces and other members that make-up a typical rack truss (not shown) which may be readily bolted thereto. In the preferred embodiment, column member 30 is secured to transverse torsional member 24 with bolt 29 through holes 28 as shown in FIGS. 3 and 4 (only one column member 30 shown attached). As indicated, the bottom of columns 30 may rest on feet 26.

In this manner, the lower portion of a structural storage rack truss, and particularly the lower portion of column member 30 which is adjacent to the access aisle, is reinforced where it is most susceptible to being hit by a lift truck or other loading device during the loading and/or unloading operations. It has been found that front column support leg 20 and rear column support leg 22 may be approximately 12-36 inches high to provide adequate protection. Of course, heights greater or less than 12-36 inches are suitable depending upon the set-up and facility requirements, as will be understood by those of skill in the art.

Figure 5:
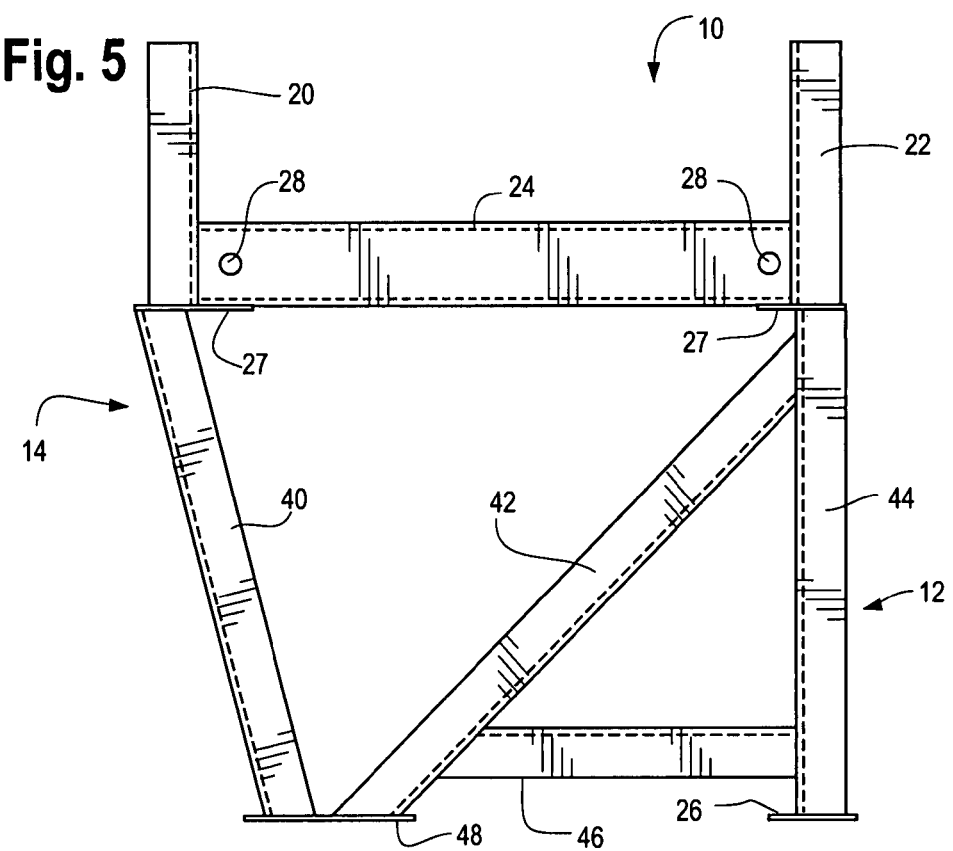
FIG. 5 is a side view of a combination of the preferred embodiment of the reinforced truss base of FIG. 1 and a typical trapezoidally-shaped truss base; and, FIG. 6 is a side view of a preferred reinforced truss base of the present invention used in conjunction with a typical drive-in rack truss base.
Figure 6:
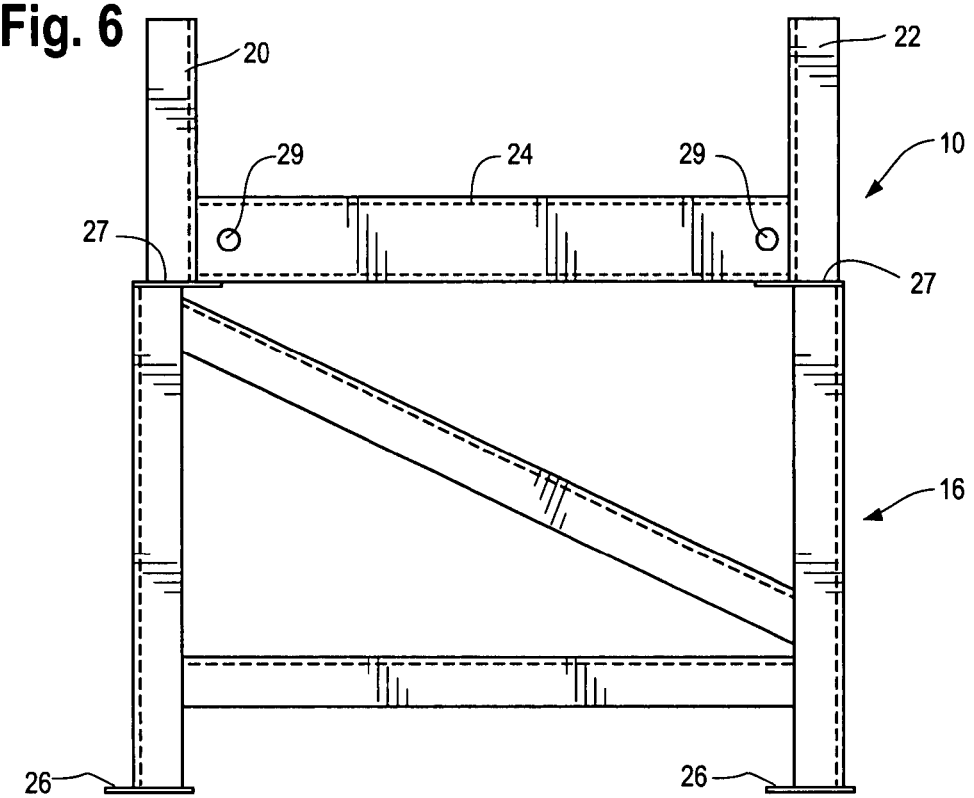

A typical trapezoidally-shaped truss base 12 may be seen by reference to FIG. 5. It consists of a front v-leg 40, a center v-leg 42, a rear leg 44 and a transverse brace 46. The bottom of rear leg 44 may be provided with a foot 26. A connecting plate 48 is provided and is used to secure the bottom of front v-leg 40 and the bottom of center v-leg 42. The bottom of center v-leg 42 is attached to connecting plate 48 and angles upwardly and is attached to upper support 49 and/or rear leg 44. Transverse brace 46 is provided between center v-leg 42 and rear leg 44 to help stiffen the trapezoidally-shaped base 12 assembly. Because the lower portion of the front v-leg 40 of the preferred embodiment is positioned away from the access aisle, the potential for it to be hit and/or damaged by a lift truck during the loading or unloading operation is reduced.

FIG. 5 shows a preferred embodiment of the present invention in which a known trapezoidally-shaped truss base 12 is used in conjunction with a preferred reinforced truss base 10 of the present invention; the combination is shown generally as 14. A reinforced truss base 10 is situated on top of trapezoidally-shaped truss base 12. Upper feet 27 may be provided (or formed as part of the top of the trapezoidally-shaped truss 12 or legs 40, 42 and/or 44). The upper feet 27 function to support column 30 as well as to interconnect bases 10 and 12, as will be understood by those of ordinary skill in the art.

FIG. 6 shows another preferred embodiment of the present invention. In this embodiment, a preferred reinforced truss 10 is attached to a typical drive-in rack truss base 16. Preferably, reinforced truss 10 is secured to truss 16 with upper feet 27, which as indicated, help to support column 30 (not shown in FIG. 7) when attached to reinforced truss base 10. And, as indicated and will be understood by those of skill in the art, reinforced truss base 10 may be used in conjunction with any other desired truss base, including knock-down bases.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. For example, a variety of materials and connections may be used as will be understood by those of skill in the art. Thus, while preferred embodiments of the present inventions have been illustrated and described, it will be understood that changes and modifications can be made without departing from the claimed invention.

Various features of the present inventions are set forth in the following claims.

What is claimed is:

1. A reinforced truss base for a storage rack truss comprising:

a front column support leg;

a rear column support leg;

a transverse torsional member interconnecting said front and rear column support legs;

a front column partially surrounding said front column support leg and attached to said transverse torsional member;

a rear column partially surrounding said rear column support leg and attached to said transverse torsional member; and wherein said front and rear column support legs are made from a structural generally u-shaped channel having a web and a pair of opposed flanges, and wherein said u-shape of each said channels face away from each other.

2. The invention of claim 1 wherein the transverse member is made from a tubular member.

3. The invention of claim 1 wherein said reinforced base is supported by a trapezoidally-shaped base.

4. The invention of claim 1 wherein said reinforced base is supported by a drive-in truss base.

5. The invention of claim 1 wherein said reinforced truss base is supported by a knock-down truss base.

6. The invention of claim 2 wherein said channels are bolted to said transverse torsional member.

7. The invention of claim 2 wherein said channels are welded to said transverse torsional member.

* * * * *